United States Patent [19]
Tanaka et al.

[11] 4,415,799
[45] Nov. 15, 1983

[54] MULTI-FUNCTION OVEN WITH CONTROL CIRCUIT FOR OPERATION DURING FERMENTATION OF YEAST CONTAINING PRODUCT

[75] Inventors: Junzo Tanaka, Fujiidera; Toshio Kai; Yoshitomo Fujitani, both of Nara, all of Japan

[73] Assignee: Matsushita Electric Industrial Co., Ltd., Kadoma, Japan

[21] Appl. No.: 237,159

[22] PCT Filed: Jul. 22, 1980

[86] PCT No.: PCT/JP80/00166
§ 371 Date: Feb. 11, 1981
§ 102(e) Date: Feb. 11, 1981

[87] PCT Pub. No.: WO81/00341
PCT Pub. Date: Feb. 19, 1981

[30] Foreign Application Priority Data

Jul. 27, 1979 [JP] Japan .................................. 54-96499
Jul. 31, 1979 [JP] Japan .................................. 54-98224

[51] Int. Cl.³ .......................... A21C 13/00; H05B 6/80
[52] U.S. Cl. .............................. 219/400; 219/10.55 B; 219/10.55 R; 219/393; 126/21 A; 99/325; 99/468
[58] Field of Search .................. 219/10.55 B, 10.55 R, 219/10.55 E, 10.55 M, 400, 393, 482, 489; 426/7, 62; 435/289, 290, 291; 99/325, 468, 326, 486, 329 R, 334, 335; 126/21 A, 21 R

[56] References Cited
U.S. PATENT DOCUMENTS 3,514,576 5/1970 Hilton et al. ........................ 219/400
3,926,738 12/1975 Nyiri et al. ........................... 435/390
4,039,776 8/1977 Roderick ......................... 219/400 X
4,052,261 10/1977 Messing et al. ................. 435/290 X
4,132,878 1/1979 Tachikawa et al. ............. 219/400 X
4,202,258 5/1980 Masuda et al. .................. 219/489 X
4,213,023 7/1980 Satoh et al. .................... 219/10.55 B
4,283,614 8/1981 Tanaka et al. ................. 219/10.55 B
4,289,792 9/1981 Smith ....................... 219/10.55 R X
4,308,444 12/1981 Takagi et al. ................. 219/10.55 B

FOREIGN PATENT DOCUMENTS 2442940 3/1976 Fed. Rep. of Germany .
47-11439 10/1972 Japan .
52-126344 9/1977 Japan .
54-98771 7/1979 Japan .
572709 2/1976 Switzerland .

Primary Examiner—M. H. Paschall
Assistant Examiner—Philip H. Leung
Attorney, Agent, or Firm—Wenderoth, Lind & Ponack

[57] ABSTRACT

This invention relates to a cooking appliance for heating a heating load (22) with a hot air as heated by a heater unit (17) and circulated in a heating chamber (2) by a fan unit (18). The temperature in the heating chamber (2) is detected by a temperature detector (26) to control the heater (17) and fan unit (18), whereby the fermentation necessary for breadmaking is performed satisfactorily to yield a neatly baked bread.

4 Claims, 6 Drawing Figures

MULTI-FUNCTION OVEN WITH CONTROL CIRCUIT FOR OPERATION DURING FERMENTATION OF YEAST CONTAINING PRODUCT

TECHNICAL FIELD

This invention relates to a hot air-circulating oven for cooking food with hot air circulated in a heating chamber, which oven is provided for obtaining a satisfactory yeast fermentation in breadmaking.

BACKGROUND ART

The ovens of the hot air-circulating type which have so far been available on the market cause no problem when used for a primary fermentation process in breadmaking wherein a dough is aerated, rounded and allowed to stand under a wet cloth in a pan for about an hour, but they cause problems when used for a subsequent secondary fermentation process in which the dough is degassed, divided and molded into easily ingestable pieces and allowed to stand for 15 to 20 minutes and further allowed to ferment for about 30 minutes. In the latter process, the surface of the bread tends to dry up under the influence of circulating hot air currents so that the final bread has many cracks in the crust and is case-hardened, thus detracting a great deal from its eating quality. If, to avoid such results, the surface of the bread is moistened with a spray of water in the course of the secondary fermentation, a good quality bread can be obtained provided that the water is added in an optimal fashion. However, if the moisture so added is excessive or inadequate, the finished bread varies widely in taste and shape. Therefore, the use of a water spray is difficult in a commercial application. Therefore, the hitherto-available hot air-circulating ovens having the fermentation capability have been additionally provided with upper and lower heaters, or in the case of the so-called oven range which is a combination of hot air circulating cooking means with high frequency heating means, high frequency waves of low output have been utilized for fermentation. These techniques, however, have the disadvantages of high cost, and because heating by highfrequency energy is germicidal, the latter method reduces the viable count of yeast organisms and, hence, fails to permit adequate fermentation.

DISCLOSURE OF INVENTION

The object of this invention, therefore, is to provide a cooking appliance, namely an oven of the hot air-circulating type which can be used for a satisfactory yeast fermentation necessary for breadmaking and which produces an improved bread having uniformity in shape and taste.

This invention will hereinafter be described by way of an embodiment thereof which is depicted in the accompanying drawings.

BEST MODE FOR CARRYING OUT THE INVENTION

Figure 1:
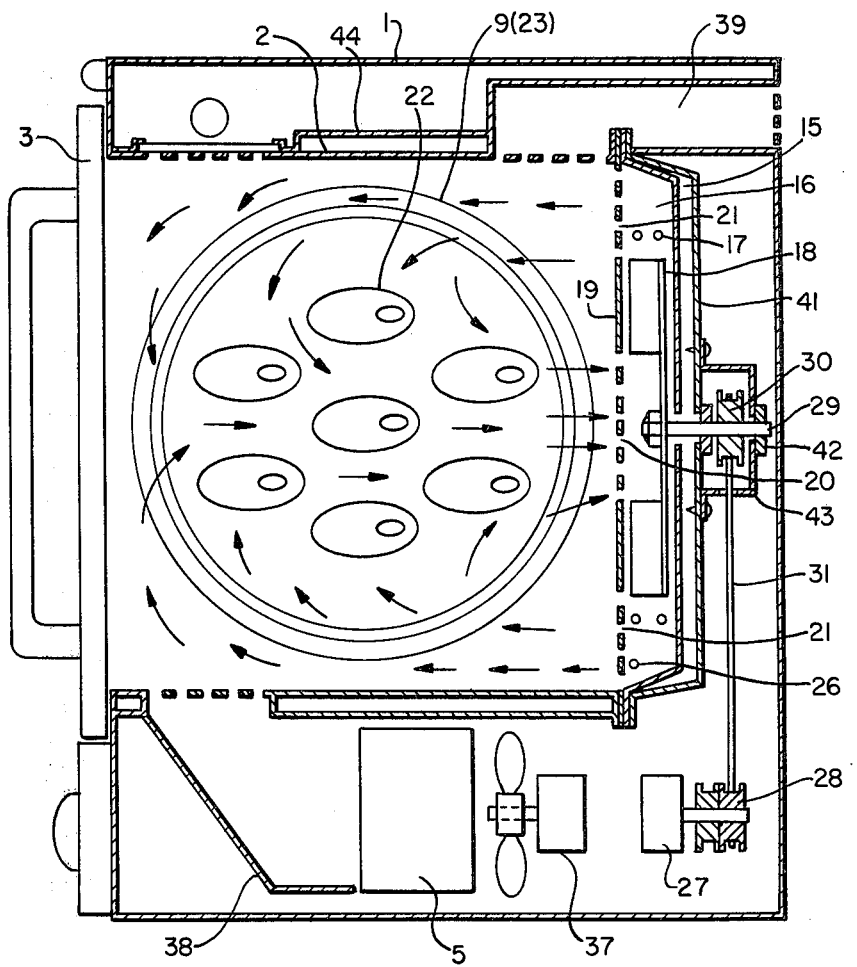
FIG. 1 is a top sectional plan view of an oven embodying this invention.

In FIGS. 1 through 5, there is shown a multi-function oven having a body 1 which includes a heating chamber 2 for cooking food. The heating chamber 2 is provided, across its front opening, with a door 3 adapted to swing open and closed with respect to the heating chamber. The top wall of the heating chamber has therein an energy feeding port 4 which communicates with a waveguide 6 which is connected to a magnetron 5 in such a manner that high frequency energy can be propagated into the heating chamber 2. The energy feeding port 4 is protected with a cover 7 made of dielectric material so that crumbs of food, water vapor, etc. will not enter the waveguide 6.

In the bottom of the heating chamber 2, there is mounted a turntable 8 driven by a magnetic drive means, with a tray 9 resting on the turntable. A magnet 10 is provided on the bottom of said turntable 8 and held in place by a plate 14b, and a pulley 11 carrying a magnet 12 is located in the bottom of the appliance externally of said heating chamber 2. As the pulley 11 is rotated, the magnet 12 carried thereby is also rotated, whereupon the magnet 10 attracted to the magnet 12 causes the turntable 8 to spin on roller means 13. The bottom wall 14a of chamber 2 and the metal plate 14b are made of nonmagnetic metal, e.g. aluminum plate, stainless steel (SUS 304) which is magnetically permeable.

Figure 2:
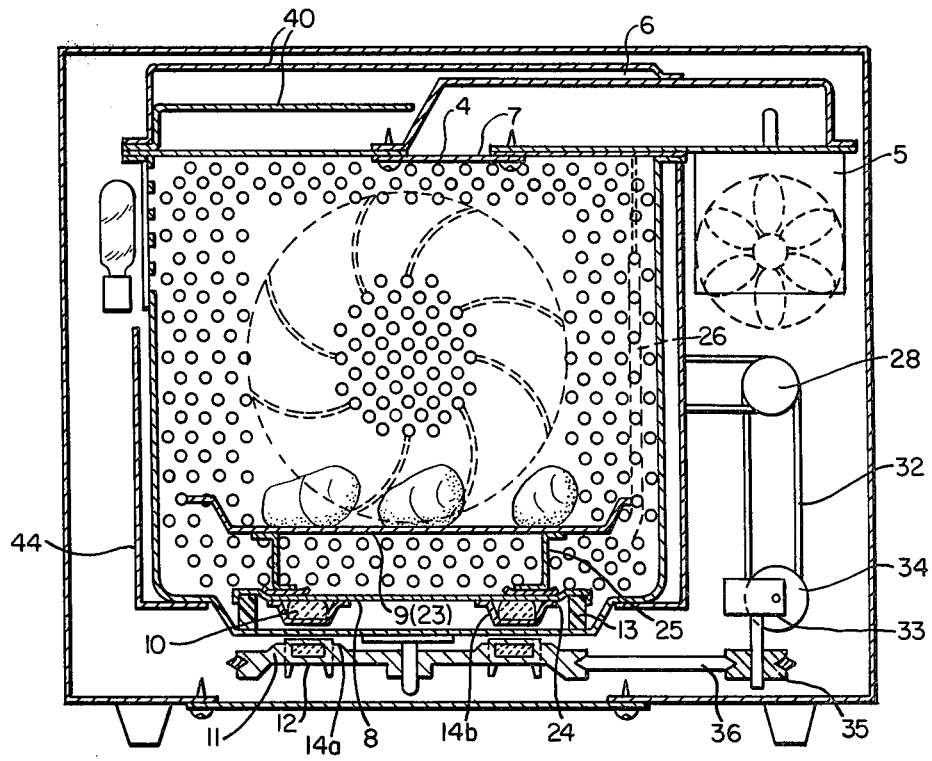
FIG. 2 is a front sectional elevation view of the oven.

At the back of said heating chamber, a compartment 16 is provided which is defined by a deep-drawn plate 15. The compartment 16 houses a heater 17 for increasing the temperature of ambient air in said heating chamber 2 and a fan 18 for circulating air through said heating chamber and compartment 16. The rear wall 19 of the heating chamber 2 has suction holes 20 in alignment with the axis of the shaft 29 of the fan 18 and discharge orifices 21 around the outside edge of the compartment 16 opening into the chamber, so that when the fan 18 is driven, the air circulates in the direction of the arrows shown in FIG. 1. Thus, the air in the heating chamber 2 enters the compartment 16 through the suction holes 20 and is heated by the heater 17 in the compartment 16. The resultant hot air is blown out into the heating chamber 2 through said discharge orifices 21 and articles 22 to be heated and resting on the cooking plate 9 revolving in the heating chamber are thereby heated and cooked. The tray 9, as shown in FIG. 2, consists of a pan 23 made of metal and a support 24 also made of metal, the two members being interconnected with pedestals 25 which may be small metal plates or bars. Thus, the hot air blown out of the discharge orifices located below the level of the pan 23 passes under the pan 23 before returning to the suction holes 20, with the result that the pan 23 is thoroughly and uniformly heated to brown the articles. Moreover, if the temperature of ambient air in the heating chamber 2 exceeds a predetermined level, a probe 26 connected to a temperature control unit 55 and located on the compartment side of the discharge orifices 21 supplies input to the control unit to control the electric power input to the heater 17 so as to maintain the ambient air temperature of the heating chamber at a constant level.

The above-described turntable 8 and air-circulating fan 18 are driven by a single motor 27. The motor 27 is connected to a pulley 28 which, on the one hand, drives the fan 18 via a pulley 30 mounted on the shaft 29 of the fan 18 and a belt 31 and, on the other hand, drives a pulley 34 mounted on a worm gear 33 via a belt 32, and the worm gear drives the pulley 11 through a pulley 35 mounted on the output shaft of said worm gear 33 and a belt 36 to thereby rotate the turntable 8. The magnetron 5 is cooled by a fan driven by a motor 37 and the secondary air blown thereby is guided by an air guide 38 into the heating chamber 2 and exhausted through an exhaust air guide 39, thus discharging any steam evolved in the heating chamber 2 in the course of high-frequency operation of the appliance.

There are also provided a number of heat insulating plates adjacent the heating chamber. Thus, on top of the heating chamber are two heat insulating plates 40 with a space therebetween, with the upper plate extending over the waveguide 6. At the back of the heating chamber is a heat insulating plate 41 is located behind the deep-drawn plate 15 defining said compartment 16, and which is provided with a bearing 42 and a bearing mount 43 for supporting the fan shaft 29. In addition, a heat insulating plate 44 is provided on the lateral side of the heating chamber 2 at a given distance with respect to the wall, with the lower extremity of said plate 44 being bent in the form of capital letter "L" and secured to the bottom wall of the heating chamber 2.

Figure 3:
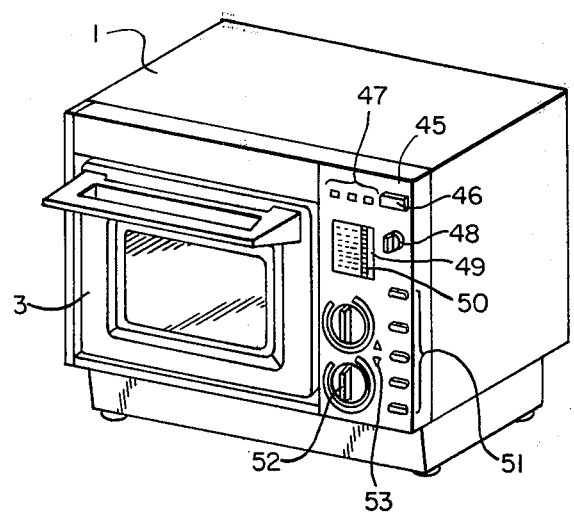
FIG. 3 is a perspective exterior view of the oven.
Figure 4:
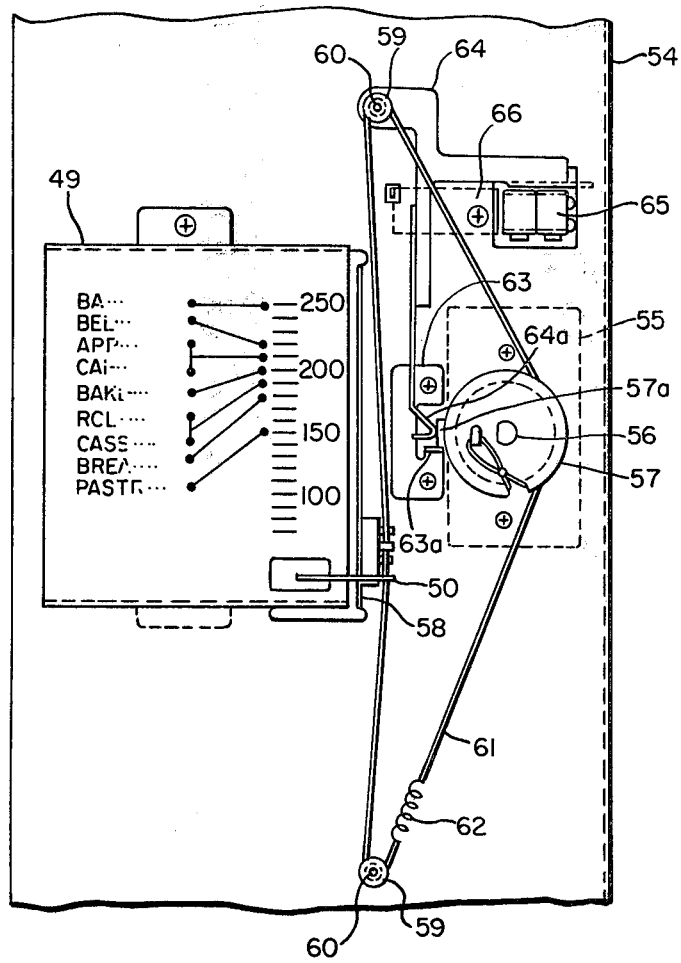
FIG. 4 is an enlarged elevation view showing a temperature control unit of the oven.
Figure 5:
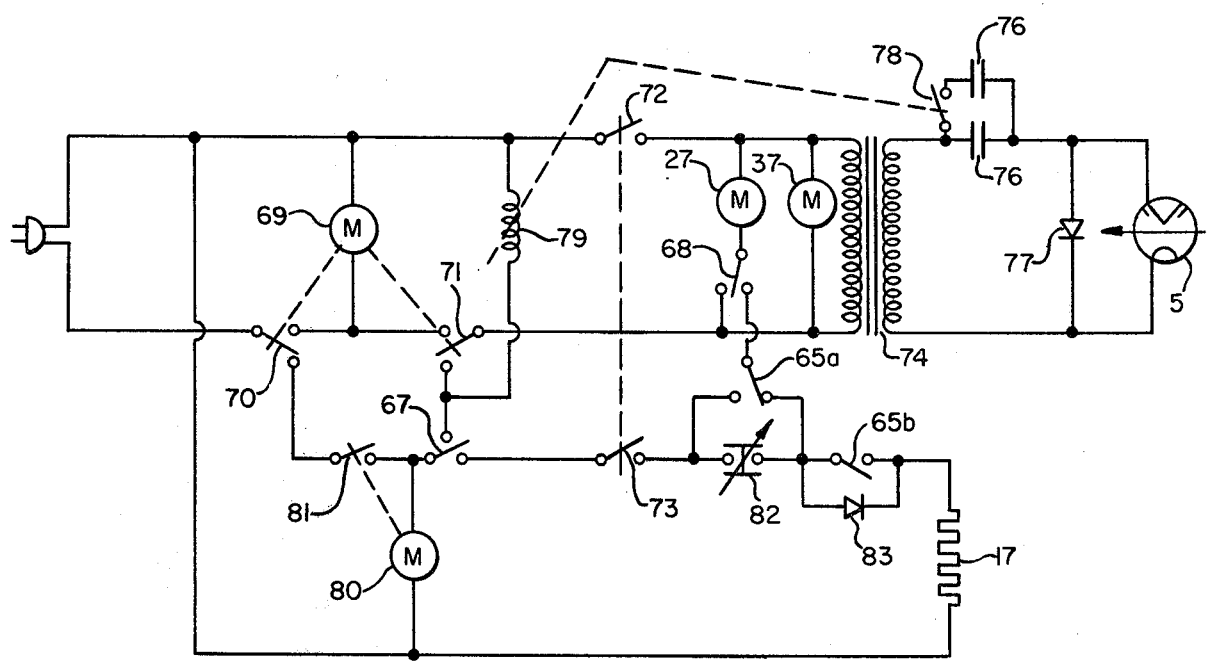
FIG. 5 is an electric circuit diagram for the oven.

The temperature control unit referred to hereinbefore will now be described in detail. The body 1 has a front operation panel 45 which carries a cooking start button 46, operation lamps 47, a temperature control knob 48, a temperature scale 49, a temperature control indicating needle 50, cooking mode selection buttons 51, time switch knobs 52 and timer indication marks 53 as depicted in FIG. 3. The construction of the temperature control unit is shown in FIG. 4. The temperature control unit 55 is mounted on a chassis 54 disposed behind the operation panel 45, and a drum 57 is mounted on a shaft 56 of the temperature control unit in such a manner that the drum 57 revolves as a unit with the temperature control knob 48. The temperature control indicating needle 50 slides on the face of an indicating needle rail 58 which is a raised portion of the chassis 54 in the vicinity of the temperature scale 49. Above and below said indicating needle rail 58 are located rollers 59 which are rotatably mounted on roller pins 60 which are secured to the chassis 54. Referring to FIG. 4, a dial cord 61 is wrapped around said drum 57, said rollers 59 and is connected to the temperature control indicating needle 50 and is tensioned by a spring 62 connected between the free ends thereof so that as the temperature control knob 48 is revolved, the indicating needle 50 slides up or down along the temperature scale 49. A temperature control stop 63 is secured to the chassis 54 in such a manner that when the temperature control indicating needle 50 has arrived at the "Ferment"-position of the temperature scale 49, the shaft 56 of the temperature control unit 55 stops rotating with a projection 57a of the drum 57 abutting a raised portion 63a of the stop 63. Thus, the "Ferment"-position corresponds to the minimum temperature setting of the temperature control unit 55. Between the roller 59 and the chassis 54, there is rotatably mounted a fermentation switch lever 64 which is has a shape substantially that of a capital letter L and, in addition, two fermentation switches 65a and 65b are secured to the chassis 54 with a set screw 66. As the temperature control knob 48 is turned to the "Ferment"-position of the temperature scale 49, one end 64a of the fermentation switch lever 64 rides on the peripheral wall of the projection 57a of said drum 57 and the other end of said lever 64 actuates the fermentation switches 65a and 65b. As the temperature control knob 48 is revolved in the high temperature direction (clockwise), the forward end 64a of the fermentation switch lever 64 is no longer biased by the projection 57a of drum 57, with the result that the fermentation switches 65a and 65b are released.

The electric circuit of this invention will now be described. When the contact points of selection switches 67 and 68 are set to the "i"-position, switches 70 and 71 of a timer motor 69 are set ON, i.e. to the contact point "i", and operation switches 72 and 73 are turned ON, motors 27 and 37 are rotated while a voltage is applied to a high-voltage transformer 74, so that capacitors 75 and 76 and a diode 77, forming a voltage doubler circuit, starts the magnetron 5 oscillating. In this condition, the solenoid switch 78 remains ON because the coil 79 thereof is not energized, so that the capacitors 75 and 76 in parallel connection produce a large output of high frequency energy. When the switches 70 and 71 are turned OFF and a switch 81 of a timer motor 80 is turned ON, the solenoid switch 78 is changed to OFF when coil 79 is energized and the capacitor 75 alone will operate to produce only a small output of high-frequency energy.

Then, when the contacts of selection switches 67 and 68 are set to the "ii"-position, the contact of fermentation switch 65a is set to the "i"-position, the switch 65b is set ON and the operation switches 72 and 73 are set ON, the motor 27 drives the turntable 8 and circulating fan 18 is driven while the heater is 17 is also energized. When the temperature of ambient air in the heating chamber 2 has reached a preset level, the switch 82 of the temperature control unit 55 is turned OFF and the heater current turned off, and, thereafter, this ON-OFF operation is repeated while the fan continues to run to maintain a predetermined temperature in the heating chamber and to thereby heat the articles therein. Then, when the temperature control knob 48 is turned counterclockwise as far as it goes, that is to say, until it is aligned with the "Ferment"-position (ca. 40° C.) of the temperature scale 49, the contact point of the fermentation switch 65a is set the "ii"-position, and the switch 65b is turned OFF. Then, when the operation switches 72 and 73 are set ON, a current flows to the motor 27 through the switch 82 of the temperature control unit 55, and the motor 27 revolves only while the switch 82 remains ON. In this condition, the current flowing through the heater 17 is halved as it passes through the diode 83.

Figure 6:
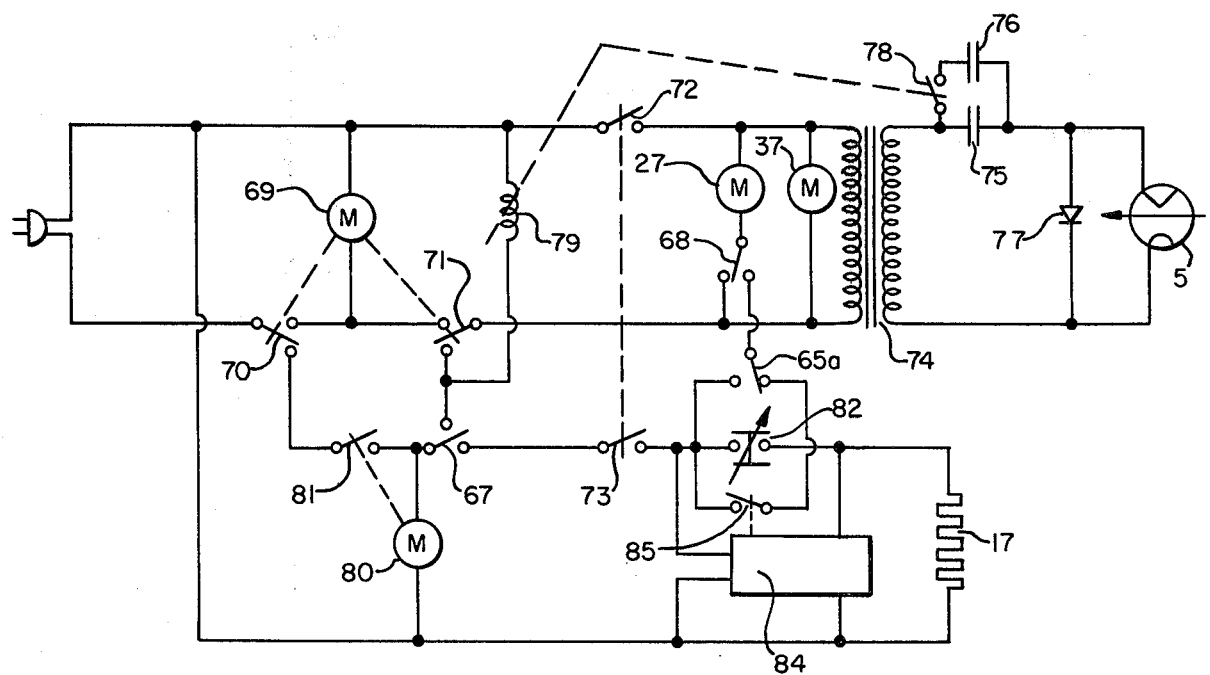
FIG. 6 is a circuit diagram for another embodiment of the oven of this invention.

FIG. 6 is a circuit diagram for another embodiment of this invention, in which the like numerals represent elements the same as or similar to those of the first embodiment. In this circuit, when the temperature control knob 48 is turned counterclockwise as far as it goes, i.e. until it is lined up with the "Ferment"-position (ca. 40° C.) of the temperature scale 49, the contact point of a fermentation switch 65a is set to the "ii"-position. Then, when operation switches 72 and 73 are turned on, the heater 17 generates heat and, at the same time, a voltage is applied to a delay circuit 84 to turn a delay circuit relay 85 ON and thus cause the motor 27 to rotate. When the temperature of ambient air in the heating chamber has exceeded the maximum fermentation temperature setting, the switch 82 of the temperature control unit 55 is turned OFF, whereupon the heater 17 is immediately cut off. However, the motor 27 is switched off only after a delay time (e.g. about 30 seconds to 1 minute) set in the delay circuit 84. Thus, the air in the heating chamber is circulated during this delay time so as to minimize the temperature gradient.

INDUSTRIAL APPLICABILITY

It will be apparent from the foregoing description that this invention achieves the following results.

1. During the fermentation of bread and other materials, the rotation of the air circulating fan is controlled after the heater has been cut off and, therefore, the duration of rotation the fan is considerably reduced. As a result, the drying of the dough surface by air currents is substantially eliminated so that the apparatus produces a tasteful, good-looking bread. The ordinary fermentation temperature for bread is between 35° and 45° C. and although it depends on ambient temperature, assuming that the secondary fermentation time is 30 minutes, the ON-time of the heater, that is to say the duration of rotation of the circulating fan, is only about 3 to 4 minutes, with the result that the drying of the bread dough can be substantially avoided.

2. Compared with a conventional hot air-circulating cooking appliance incorporating resistance heaters at the top and bottom of its heating chamber, the cooking appliance according to this invention, which does not require such resistance heaters, is more economical and, moreover, because the effective space within the heating chamber is large and can be easily cleaned, the latter appliance can be more easily operated and maintained. In addition, because the heater at the bottom of the heating chamber is omitted, the turntable can be mounted in the position described and illustrated. The net result is a cooking appliance with an improved heat distribution. In the past, the installation of two tiers of fermentation trays presented problems in association with the temperature gradient and these problems defied a neat solution. In accordance with this invention, these problems are solved merely by decreasing the current input to the heating unit.

3. Thus, because the current input to the heating unit is decreased, the calories generated by the heater during energization thereof is decreased and even if fermentation is carried out on two tiers of trays, the temperature gradient between the upper and lower trays is minimized so as to produce a uniform fermentation. Thus, after stoppage of the air circulating fan, the calories accumulated in the heater unit can emigrate but if the heater input current is decreased to reduce the heater wattage and, hence, the accumulation of calorie, the temperature gradient is small even after stoppage of the circulating fan. The result is that the loaves of bread on the upper and lower tiers after fermentation are in substantially the same condition, thus providing uniformly shaped loaves during baking.

4. The control of rotation of the circulating fan and the heater input current takes place automatically when the temperature control knob is aligned with the "ferment"-position on the temperature scale. The result is that the appliance is very easy to manipulate. In the conventional appliance where fermentation is effected by upper and lower heaters, it is necessary to align both the temperature control and heater switch knob to the respective "Ferment"-positions and if one fails to do either operation, one cannot obtain a satisfactory fermentation.

5. Any temperature difference in the vertical direction is eliminated when, as in the second embodiment of this invention, the duration of rotation of the circulating fan is so controlled as to cause the fan to continue to turn for about 30 seconds to one minute after the heater unit has been turned off. If the means for reducing the heater input as that described in the first embodiment is omitted and the heater unit and fan are cut off at the same time, the calories accumulated in the heater unit would migrate upwards to create a temperature gradient, but when the delay circuit relay is used to cause the fan to turn even after the heater has been cut off, the heating unit is cooled to minimize the upward migration of heat. Therefore, even if the capacity of the heater is large, the vertical temperature gradient is greatly reduced so that very satisfactory fermentation can be conducted.

We claim:

1. A multi-function oven for carrying out yeast fermentation, comprising:

an oven body having a heating chamber therein for receiving articles to be cooked;

an electric resistance type heater outside said heating chamber for increasing the temperature in said heating chamber, a partition separating said heating chamber from the space where said heater is located, said partition plate having a plurality of ventilating holes therein;

fan means for circulating the air from said heating chamber over said heater and back into said heating chamber;

means for supplying electric power to said heater and to said fan means;

temperature detecting means in said heating chamber; and temperature control means to which said temperature detecting means is connected and which is in turn connected to said electric power supply means and including temperature setting means settable to a fermentation temperature for setting said temperature control means to a first control condition and settable to a temperature other than a fermentation temperature for setting said temperature control means to a second control condition, said temperature control means having means for, when set to said first control condition, controlling the electric power supply to said heater and to said fan means in response to a yeast fermentation temperature in said heating chamber for intermittently supplying power to said heater and to said fan means for keeping the temperature in the heating chamber at yeast fermentation temperature for fermentation of yeast in articles in said heating chamber, and when set to said second control condition, controlling the electric power supply to said heater and to said fan means in response to the temperature in said heating chamber for intermittently supplying power only to said heater and supplying constant power to said fan means for keeping the temperature in said heating chamber at the temperature other than that suitable for yeast fermentation, said control means further having means for, when said control means is in said first control condition, causing said fan means to continue running for a predetermined period of time after deenergization of said heater.

2. A multi-function oven as claimed in claim 1 wherein said temperature control means comprises means for supplying a reduced amount of current to said electric heater when said temperature control means is set to keep the temperature in said heating chamber suitable for fermentation as compared to the amount of current supplied to said electric heater when said temperature control means is set to keep the temperature in said heating chamber at another temperature.

3. A multi-function oven as claimed in claim 1 in which said temperature control means comprises heater operation detection means connected between said electric heater and said fan means for, when said temperature control means is set to keep the temperature in said heating chamber suitable for fermentation, detecting when the power supply to said heater is changed and controlling the supply of power to said fan means in response thereto.

4. A multi-function oven as claimed in claim 3 wherein said means for causing said fan means to continue running comprises a delay relay in said heater operation detection means for delaying the action of controlling the supply of power to said fan means when a change in power supply to said electric heater has been detected.

* * * * *